United States Patent Office 3,425,911
Patented Feb. 4, 1969

3,425,911
METHOD OF PRODUCING TETRACYCLINE
Miloslav Vondracek, Josef Slezak, Milos Herold, and Karel Culik, Prague, Czechoslovakia, assignors to Spofa Sdruzeni Podniku Pro Zdravotnickou Vyrobu, Prague, Czechoslovakia
No Drawing. Filed June 8, 1965, Ser. No. 462,398
Claims priority, application Czechoslovakia, June 13, 1964, 3,412/64
U.S. Cl. 195—80           10 Claims
Int. Cl. C12k 1/10

ABSTRACT OF THE DISCLOSURE

A method for producing tetracycline, which comprises aerobically and submerged culturing in a liquid culturing medium containing assimilable carbon and nitrogen sources plus inorganic nutrient salts and including between 0.0001% and 0.02% of a compound of the formula

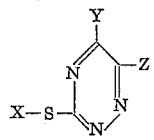

wherein X is selected from the group consisting of hydrogen and alkyl with between 1 and 6 carbon atoms, Z is selected from the group consisting of hydrogen, alkyl with between 1 and 6 carbon atoms, alkenyl with between 1 and 6 carbon atoms, aryl, aralkyl, —CH—$CH_6H_5$ and —$(CH_2)_nCOOH$, —$(CH_2)_nCONH_2$, $n$ being an integer between 0 and 7 inclusive, and wherein Y is —OH, a microorganism belonging to the genus Streptomyces and capable of producing chlorotetracycline and tetracycline, whereby due to the presence of said compound in said culturing medium the proportion of tetracycline produced will be increased relative to the proportion of chlorotetracycline produced; and recovering tetracycline from the thus formed fermented broth.

---

The present invention relates to a method for producing tetracycline and, more particularly, the present invention is concerned with a process according to which tetracycline is produced by submerged fermentation in a liquid nutrient medium containing assimilable carbon and nitrogen sources plus inorganic nutrient salts under aerobic conditions, using as the producing microorganism a member of the genus Streptomyces, capable of producing both chlorotetracycline and tetracycline, followed by isolation or recovery of tetracycline from the fermented broth.

It is known that nearly all streptomycetes will yield under favorable cultivation conditions, particularly utilizing liquid nutrient media known to those skilled in the art, chlorotetracycline (hereinafter identified as "CTC") or tetracycline (hereinafter identified as "TC"), and generally mixtures of CTS and TC.

For practical reasons it is generally preferable if the end product of the fermentation process contains a large proportion of one and a small proportion of the other of the two antibiotics CTC and TC since their separation from each other during their isolation and recovery from the fermented broth is very troublesome.

For best results it is desirable that the antibiotics content of the fermented broth should consist of between 90% and 95% or more of one of the two antibiotics and, correspondingly, of 10% or less of the other of the two antibiotics.

It is therefore generally advisable to direct the fermentation so as to enhance as much as possible the production of one of the two antibiotics and to suppress the production of the other.

In the conventional media suitable for obtaining the highest yields of antibiotic activity by means of a given strain of the genus Streptomyces, usually the presence of a high concentration of chloride ions will result in the preferential production of CTC in a proportion of between 90 and 95% of the total antibiotics content.

Several methods have been proposed for obtaining by using the same strain almost equally high yields of TC, while the amount of simultaneously formed CTC should not exceed between about 5 and 10% of the total yield of tetracycline-type antibiotics. For instance, it has been proposed to suppress the chloride ion concentration in the fermentation medium. However, this method is rather laborious and expensive. Other methods propose the use of certain chlorination inhibitors which are capable even in the presence of chlorine ions to enhance TC biosynthesis and to restrain CTC biosynthesis.

It is an object of the present invention to provide a method of fermentative production of tetracycline in such a manner that only a relatively very small proportion of chlorotetracycline will be simultaneously produced, and which method can be carried out in a simple and economical manner.

Other objects and advantages of the present invention will become apparent from a further reading of the description and of the appended claims.

With the above and other objects in view, the present invention contemplates a method for producing tetracycline, which comprises aerobically and submerged culturing in a liquid culturing medium containing assimilable carbon and nitrogen sources plus inorganic nutrient salts and including a compound of the formula

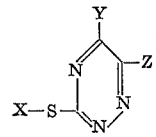

wherein X is selected from the group consisting of hydrogen and alkyl with between 1 and 6 carbon atoms, Z is selected from the group consisting of hydrogen, alkyl with between 1 and 6 carbon atoms, alkenyl with between 1 and 6 carbon atoms, aryl, aralkyl, —CH=$CH_6H_5$ and —$(CH_2)_nCOOH$, —$(CH_2)_nCONH_2$, $n$ being an integer between 0 and 7 inclusive, and wherein Y is selected from the group consisting of hydrogen, alkyl with between 1 and 6 carbon atoms, aryl, aralkyl, —OH, —SH and —$NH_2$, a microorganism belonging to the genus Streptomyces and capable of producing chlorotetracycline and tetracycline, whereby due to the presence of the compound in the culturing medium the proportion of tetracycline produced will be increased relative to the proportion of chlorotetracycline produced, and recovering tetracycline from the thus formed fermented broth.

The above described compounds preferably are added to the conventional fermentation medium in amounts from 0.0001% to 0.02%.

Good results are achieved for instance with the following compounds:

3-methylmercapto-5-hydroxy-6-benzyl-1,2,4-triazine,
3-mercapto-5-hydroxy-1,2,4-triazine,
3-mercapto-5-hydroxy-6-carboxy-1,2,4-triazine,
3-mercapto-5-hydroxy-6-carboxamido-1,2,4-triazine,
Beta-(3-mercapto-5-hydroxy-1,2,4-triazine-6)-propionic acid, 3-mercapto-5,6-diphenyl-1,2,4-triazine,
3-mercapto-5-hydroxy-6-methyl-1,2,4-triazine and
3-mercapto-5-hydroxy-6-benzyl-1,2,4-triazine These compounds, which are derivatives of 3-mercapto-1,2,4-triazine, exhibit a marked antimetabolic effect on the chlorination of the tetracycline-type antibiotic during its fermentative biosynthesis. This effect is achieved even with concentration of these compounds in the nutrient medium which are as low as 0.0001 to 0.0002%, however, generally the most advantageous range of concentration of these compounds, frequently capable of achieving the production of between 90 and 95% TC and only between 10 and 5% CTC is between 0.0005% and 0.01%. With increasing concentration of these antimetabolic compounds their nonspecific toxic effect becomes more prominent just like in the case of other chlorination inhibitors, and the overall yield of TC and CTC decreases.

In a given conventional medium in which fermentation with the strain *Streptomyces aureofaciens* yielded CTC and TC in the ratio 95:5, it was possible to reverse this ratio to 5:95 by incorporating in the nutrient medium siutable quantities of the above mentioned triazine derivatives, without thereby noticeably influencing the overall yield.

The percentage amount of the antimetabolic compound, for instance one of the above described 3-mercapto-1,2,4-triazine compounds, which is required to obtain the desired suppression of the production of CTC could be reduced by additionally introducing into the nutrient medium bromine ions in a concentration of between about 0.0005% and 1%. The combined use of bromine ions and of a smaller proportion of the above described antimetabolitic compounds could achieve the desired inhibition of production of CTC without causing the progressively increasing reduction in the total yield of antibiotics which is experienced by increasing the proportion of the above described antimetabolitic compounds in the nutrient meduim.

The following examples are given as illustrative only without, however, limiting the invention to the specific details of the examples.

A fermentation medium was prepared, containing 4% sucrose, 3% soy bean meal, 0.5% ammonium sulfate, 0.5% calcium carbonate, 0.2% molasses, 0.4% corn-steep liquor (65% solids), and 0.038% sodium chloride.

This fermentation medium was inoculated with 5% of a 24-hours' old culture of a strain of *Streptomyces aureofaciens* which had been grown in a meduim which differed from the above described fermentation medium only by the omission of sodium chloride therefrom.

Cultivation was carried out in fermentors having a capacity of 10 liters, under aeration and agitation at 30° C. for between 84 and 92 hours.

The same process was carried out in control media which differed from the above described fermentation medium by the omission of sodium chloride.

In such control media, CTC production under the above described conditions amounted to between 0.1 and 0.2% (1000–2000 mcg./ml.).

In addition to the overall antibiotic concentration which was determined throughout each fermentation, also the CTC:TC ratio was determined at the end of each fermentation by paper chromatography against a series of standard substances.

Several antimetabolitic substances were added to the above described fermentation medium after sterilization of the latter in the form of sterilized suspensions of various concentrations of the respective antimetabolites, and the CTC-TC production was compared with the results obtained by fermentation of the same strain of *Streptomyces aureofaciens* in the above described control media, in the absence of antimetabolitic substances but under otherwise equal conditions.

These experiments are summarized in the following examples.

EXAMPLE I

[Antimetabolite used: 3-methylmercapto-5-hydroxy-6-benzyl-1,2,4-triazine (Barlow, Welch, J. Am. Chem. Soc. 78, 1258, 1956)]

| Antimetabolite concentration in fermentation medium (percent) | Overall yield of antibiotic activity (percent of control) | CTC:TC ratio |
| --- | --- | --- |
| 0 (control) | 100 | 79:21 |
| 0.004 | 70.5 | 26:74 |

EXAMPLE II

[Antimetabolite used: 3-mercapto-5-hydroxy-1,2,4-triazine (Gut, Coll. Czech.Communs. 26, 986, 1961)]

| Antimetabolite concentration in fermentation medium (percent) | Overall yield of antibiotic activity (percent of control) | CTC:TC ratio |
| --- | --- | --- |
| 0 (control) | 100 | 79:21 |
| 0.004 | 90 | 5:95 |
| 0.02 | 45.5 | 5:95 |

EXAMPLE III

[Antimetabolite used: 3-mercapto-5-hydroxy-6-carboxy-1,2,4-triazine (Barlow, Welch, J. Am. Chem. Soc. 78, 1258, 1956)]

| Antimetabolite concentration in fermentation medium (percent) | Overall yield of antibiotic activity (percent of control) | CTC:TC ratio |
| --- | --- | --- |
| 0 (control) | 100 | 76:24 |
| 0.02 | 102 | 38:62 |

EXAMPLE IV

[Antimetabolite used: 3-mercapto-5-hydroxy-6-carboxamido-1,2,4-triazine (Weisberger, The Chemistry of Heterocyclic Compounds, Vol. 10, 1956)]

| Antimetabolite concentration in fermentation medium (percent) | Overall yield of antibiotic activity (percent of control) | CTC:TC ratio |
| --- | --- | --- |
| 0 (control) | 100 | 80:20 |
| 0.008 | 96.5 | 71:29 |
| 0.02 | 105 | 50:50 |

EXAMPLE V

[Antimetabolite used: beta-(3-mercapto-5-hydroxy-1,2,4,-triazine-6)-propionic acid (Slouka, Pharmazie 15, 317, 1960)]

| Antimetabolite concentration in fermentation medium (percent) | Overall yield of antibiotic activity (percent of control) | CTC:TC ratio |
| --- | --- | --- |
| 0 (contol) | 100 | 76:24 |
| 0.02 | 105 | 40:60 |

EXAMPLE VI

[Antimetabolite used: 3-mercapto-5,6-diphenyl-1,2,4-triazine (Weisberger, ibidem)]

| Antimetabolite concentration in fermentation medium (percent) | Overall yield of antibiotic activity (percent of control) | CTC:TC ratio |
| --- | --- | --- |
| 0 (control) | 100 | 76:24 |
| 0.004 | 84 | 65:35 |

EXAMPLE VII

[Antimetabolite used: 3-mercapto-5-hydroxy-6-methyl-1,2,4-triazine (Weisberger, ibidem)]

| Antimetabolite concentration in fermentation medium (percent) | Overall yield of antibiotic activity (percent of control) | CTC:TC ratio |
| --- | --- | --- |
| 0 (control) | 100 | 80:20 |
| 0.0008 | 97 | 23:77 |
| 0.004 | 80 | 6:94 |

EXAMPLE VIII

[Antimetabolite used: 3-mercapto-5-hydroxy-6-benzyl-1,2,4-triazine (Weisberger, ibidem)]

| Antimetabolite concentration in fermentation medium (percent) | Overall yield of antibiotic activity (percent of control) | CTC:TC ratio |
| --- | --- | --- |
| 0 (control) | 100 | 78:22 |
| 0.004 | 80 | 19:81 |
| 0.008 | 58 | 5:95 |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method for producing tetracycline, which comprises aerobically and submerged culturing in a liquid culturing medium containing assimilable carbon and nitrogen sources plus inorganic nutrient salts and including between 0.001% and 0.02% of a compound of the formula

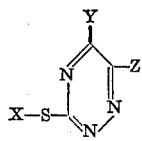

wherein X is selected from the group consisting of hydrogen and alkyl with between 1 and 6 carbon atoms, Z is selected from the group consisting of hydrogen, alkyl with between 1 and 6 carbon atoms, alkenyl with between 1 and 6 carbon atoms aryl, aralkyl, —CH=CH$_6$H$_5$ and —(CH$_2$)$_n$COOH, —(CH$_2$)$_n$CONH$_2$, $n$ being an integer between 0 and 7 inclusive, and wherein Y is —OH, a microorganism belonging to the genus Streptomyces and capable of producing chlorotetracycline and tetracycline, whereby due to the presence of said compound in said culturing medium the proportion of tetracycline produced will be increased relative to the proportion of chlorotetracycline produced; and recovering tetracycline from the thus formed fermented broth.

2. A method for producing tetracycline, which comprises aerobically and submerged culturing in a liquid culturing medium containing assimilable carbon and nitrogen sources plus inorganic nutrient salts and including between 0.005% and 0.01% of a compound of the formula

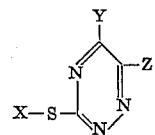

wherein X is selected from the group consisting of hydrogen and alkyl with between 1 and 6 carbon atoms, Z is selected from the group consisting of hydrogen, alkyl with between 1 and 6 carbon atoms, alkenyl with between 1 and 6 carbon atoms, aryl, aralkyl, —CH=CH$_6$H$_5$ and —(CH$_2$)$_n$COOH, —(CH$_2$)$_n$CONH$_2$, $n$ being an integar between 0 and 7 inclusive, and wherein Y is —OH, a microorganism belonging to the genus Streptomyces and capable of producing chlorotetracycline and tetracycline, whereby due to the presence of said compound in said culturing medium the proportion of tetracycline produced will be increased relative to the proportion of chlorotetracycline produced; and recovering tetracycline from the thus formed fermented broth.

3. A method for producing tetracyclines, which comprises aerobically and submerged culturing in a liquid culturing medium containing assimilable carbon and nitrogen sources plus inorganic nutrient salts and including between 0.0001% and 0.02% of a compound selected from the group consisting of 3-methylmercapto-5-hydroxy-6-benzyl-1,2,4-triazine,
3-mercapto-5-hydroxy-1,2,4-triazine,
3-mercapto-5-hydroxy-6-carboxy-1,2,4-triazine,
3-mercapto-5-hydroxy-6-carboxamido-1,2,4-triazine,
Beta-(3-mercapto-5-hydroxy-1,2,4-triazine-6)-propionic acid,
3-mercapto-5-hydroxy-6-methyl-1,2,4-triazine and
3-mercapto-5-hydroxy-6-benzyl-1,2,4-triazine, a microorganism belonging to the genus Streptomyces and capable of producing chlorotetracycline and tetracycline, whereby due to the presence of said compound in said culturing medium the proportion of tetracycline produced will be increased relative to the proportion of chlorotetracycline produced; and recovering tetracycline from the thus formed fermented broth.

4. A method for producing tetracycline, which comprises aerobically and submerged culturing in a liquid culturing medium containing assimilable carbon and nitrogen sources plus inorganic nutrient salts and including between about 0.001% and 0.02% of the compound 3-methylmercapto - 5 - hydroxy-6-benzyl-1,2,4-triazine, a microorganism belonging to the genus Streptomyces and capable of producing chlorotetracycline and tetracycline, whereby due to the presence of said compound in said culturing medium the proportion of tetracycline produced will be increased relative to the proportion of chlorotetracycline produced; and recovering tetracycline from the thus formed fermented broth.

5. A method for producing tetracycline, which comprises aerobically and submerged culturing in a liquid culturing medium containing assimilable carbon and nitrogen sources plus inorganic nutrient salts and including between about 0.001% and 0.02% of the compound 3-mercapto-5-hydroxy-1,2,4-triazine, a microorganism belonging to the genus Streptomyces and capable of producing chlorotetracycline and tetracycline, whereby due to the presence of said compound in said culturing medium the proportion of tetracycline produced will be increased relative to the proportion of chlorotetracycline produced; and recovering tetracycline from the thus formed fermented broth.

6. A methol for producing tetracycline, which comprises aerobically and submerged culturing in a liquid culturing medium containing assimilable carbon and nitrogen sources plus inorganic nutrient salts and including between about 0.001% and 0.02% of the compound 3-mercapto-5-hydroxy-6-carboxy-1,2,4-triazine, a microorganism belonging to the genus Streptomyces and capable of producing chlorotetracycline and tetracycline, whereby due to the presence of said compound in said culturing medium the proportion of tetracycline produced will be increased relative to the proportion of chlorotetracycline produced; and recovering tetracycline from the thus formed fermented broth.

7. A method for producing tetracycline, which comprises aerobically and submerged culturing in a liquid culturing medium containing assimilable carbon and nitrogen sources plus inorganic nutrient salts and including between about 0.001% and 0.02% of the compound 3-mercapto-5-hydroxy-6-carboxamido-1,2,4-triazine, a microorganism belonging to the genus Streptomyces and capable of producing chlorotetracycline and tetracycline, whereby due to the presence of said compound in said culturing medium the proportion of tetracycline produced will be increased relative to the proportion of chlorotetracycline produced; and recovering tetracycline from the thus formed fermented broth.

8. A method for producing tetracycline, which comprises aerobically and submerged culturing in a liquid culturing medium containing assimilable carbon and nitrogen sources plus inorganic nutrient salts and including between about 0.001% and 0.02% of the compound beta-(3 - mercapto-5-hydroxyl-1,2,4-triazine-6)-propionic acid, a microorganism belonging to the genus Streptomyces and capable of producing chlorotetracycline and tetracycline, whereby due to th presence of said compound in said culturing medium the proportion of tetracycline produced will be increased relative to the proportion of chlorotetracycline produced; and recovering tetracycline from the thus formed fermented broth.

9. A method for producing tetracycline, which comprises aerobically and submerged culturing in a liquid culturing medium containing assimilable carbon and nitrogen sources plus inorganic nutrient salts and including between about 0.001% and 0.02% of the compound 3-mercapto-5-hydroxy-6-methyl-1,2,4-triazine, a microorganism belonging to the genus Streptomyces and capable of producing chlorotetracycline and tetracycline, whereby due to the presence of said compound in said culturing medium the proportion of tetracycline produced will be increased relative to the proportion of chlorotetracycline produced; and recovering tetracycline from the thus formed fermented broth.

10. A method for producing tetracycline, which comprises aerobically and submerged culturing in a liquid culturing medium containing assimilable carbon and nitrogen sources plus inorganic nutrient salts and including between about 0.001% and 0.02% of the compound 3-mercapto-5-hydroxy-6-benzyl-1,2,4-triazine, a microorganism belonging to the genus Streptomyces and capable of producing chlorotetracycline and tetracycline, whereby due to the presence of said compound in said culturing medium the proportion of tetracycline produced will be increased relative to the proportion of chlorotetracycline produced; and recovering tetracycline from the thus formed fermented broth.

References Cited
UNITED STATES PATENTS

| | | | |
|---|---|---|---|
| 2,923,668 | 2/1960 | Goodman et al. | 195—80 |
| 3,019,173 | 1/1962 | Arishima et al. | 195—80 |

MAURICE W. GREENSTEIN, *Primary Examiner.*

U.S. Cl. X.R.

195—114